(12) United States Patent
Rakshit et al.

(10) Patent No.: US 11,166,069 B1
(45) Date of Patent: Nov. 2, 2021

(54) VIDEO CONTENT CONVERSION

(71) Applicant: International Business Machines Corporation, Armonk, NY (US)

(72) Inventors: Sarbajit K. Rakshit, Kolkata (IN); Martin Franz, Yorktown Heights, NY (US); Vittorio Castelli, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/865,447

(22) Filed: May 4, 2020

(51) Int. Cl.
*H04N 21/442* (2011.01)
*H04N 21/422* (2011.01)
*H04N 21/466* (2011.01)
*G06N 20/00* (2019.01)
*G06F 3/01* (2006.01)
*G06K 9/46* (2006.01)

(52) U.S. Cl.
CPC ....... *H04N 21/44204* (2013.01); *G06F 3/016* (2013.01); *G06K 9/4676* (2013.01); *G06N 20/00* (2019.01); *H04N 21/42203* (2013.01); *H04N 21/44218* (2013.01); *H04N 21/466* (2013.01)

(58) Field of Classification Search
CPC ......... H04N 21/4223; H04N 21/44218; H04N 21/42201; H04N 21/44008; H04N 21/4728; H04N 21/41415; H04N 21/42203; H04N 21/251
See application file for complete search history.

(56) References Cited

U.S. PATENT DOCUMENTS

| 10,120,438 | B2 | 11/2018 | Osman et al. |
| 10,225,621 | B1* | 3/2019 | Newell ............ H04N 21/23412 |
| 2009/0051561 | A1* | 2/2009 | Cadavid ................. G09F 21/02 340/691.6 |
| 2009/0067812 | A1* | 3/2009 | Park ..................... G11B 27/105 386/244 |
| 2013/0201305 | A1* | 8/2013 | Sibecas ............ H04N 21/44218 348/54 |
| 2015/0063780 | A1* | 3/2015 | Shintani ................. H04N 21/84 386/241 |
| 2015/0146879 | A1* | 5/2015 | Nguyen ........... H04N 21/43615 381/74 |

(Continued)

FOREIGN PATENT DOCUMENTS

JP   4063719 B2   3/2008

OTHER PUBLICATIONS

Zhang et al., "Automatic video description generation via LSTM with joint two-stream encoding", 2016 23rd International Conference on Pattern Recognition (ICPR), Dec. 4-8, 2016, pp. 2924-2929.

(Continued)

*Primary Examiner* — Jason Salce
(74) *Attorney, Agent, or Firm* — Stosch Sabo

(57) ABSTRACT

Described are techniques for video conversion for accessibility including a technique comprising determining, using data from at least one camera, that a user is distracted based on a direction of gaze of the user with respect to a display device presenting video content. The technique further comprises converting, by a machine learning model, the video content to audio content in response to determining the user is distracted, wherein the audio content comprises a description of the video content. The technique further comprises outputting, using at least one speaker, the audio content to the user while the user is distracted.

18 Claims, 7 Drawing Sheets

(56) References Cited

U.S. PATENT DOCUMENTS

| | | | |
|---|---|---|---|
| 2015/0350621 A1* | 12/2015 | Sawa | H04N 21/23412 |
| | | | 386/201 |
| 2016/0005016 A1* | 1/2016 | Eliahu | G06Q 20/28 |
| | | | 705/44 |
| 2017/0374120 A1* | 12/2017 | Vishnia | H04N 21/472 |
| 2017/0374402 A1* | 12/2017 | Pogorelik | G06F 16/738 |
| 2018/0007431 A1* | 1/2018 | Sidhu | H04N 21/4394 |
| 2019/0069045 A1 | 2/2019 | Kahn | |
| 2019/0261053 A1* | 8/2019 | Burkart | H04N 21/439 |
| 2020/0090659 A1* | 3/2020 | Castelli | G06F 16/685 |

OTHER PUBLICATIONS

Kar et al., "A Review and Analysis of Eye-Gaze Estimation Systems, Algorithms and Performance Evaluation Methods in Consumer Platforms", IEEE Access vol. 5, Aug. 7, 2017, 25 pages.

Hutt et al., "The Eyes Have It: Gaze-based Detection of Mind Wandering during Learning with an Intelligent Tutoring System", Proceedings of the 9th International Conference on Educational Data Mining, 2016, pp. 86-93.

Krishnamoorthy et al., "Generating Natural-Language Video Descriptions Using Text-Mined Knowledge", Copyright 2013, Association for the Advancement of Artificial Intelligence, 7 pages.

Kanevsky, D., "Preference-Based Acceleration of Video Material", Technical Disclosure Commons—Defensive Publications Series, Oct. 11, 2018, 9 pages.

Mell et al., "The NIST Definition of Cloud Computing", Recommendations of the National Institute of Standards and Technology, Sep. 2011, 7 pages.

\* cited by examiner

VIDEO CONTENT CONVERSION

BACKGROUND

The present disclosure relates to content accessibility, and, more specifically, to generating supplemental content corresponding to video content for distracted users.

Video content is increasingly accessible due to the proliferation of user devices and the improvements in streaming technology and wireless communication. As a result, video content can be viewed on phones, tablets, laptops, desktops, televisions, vehicle consoles, and other displays at most times and in most locations. Despite the improved distribution and accessibility of video content, numerous things may distract a viewer from video content. For example, a participant in an online video conference may monitor email during the video conference. These and other examples can cause viewers to be distracted for portions of video content that they are viewing.

Viewing video content while distracted is inefficient. For example, a variety of video content includes audio content that may not fully reflect the information in the video content. For example, during a video conference, a presenter may direct a viewer's attention to a graph or chart but not elaborate on the contents of the graph or chart. For a viewer that is listening to the presenter but not looking at the video content, information is still lost. Accordingly, there is a growing need to improve video content accessibility for users who may be intermittently distracted while viewing the video content.

SUMMARY

Aspects of the present disclosure are directed toward a computer-implemented method comprising determining, using data from at least one camera, that a user is distracted based on a direction of gaze of the user with respect to a display device presenting video content. The method further comprises converting, by a machine learning model, the video content to audio content in response to determining the user is distracted, where the audio content comprises a description of the video content. The method further comprises outputting, using at least one speaker, the audio content to the user while the user is distracted.

Advantageously, the aforementioned method enhances usability of the display device insofar as supplemental audio content based on the video content is selectively provided to the user when the user is distracted from the display device. A second advantage relates to the machine learning model. Using the machine learning model enables a faster and more accurate conversion of the video content to supplemental audio content than may be achieved using static rules. In fact, machine learning and deep learning may be the only tools with the power and flexibility to generate useful supplemental audio content from video content given the wide variety of video content that exists (e.g., presentations, television shows, movies, sporting events, news casts, and so on). A third advantage relates to the direction of gaze of the user as detected by at least one camera in order to determine that the user is distracted. Utilizing the direction of gaze to characterize a distracted viewer of video content is advantageous insofar as it is an accurate and efficient of method detecting distracted users.

Another aspect of the present disclosure based on the above-described method further includes determining the user is distracted by determining the direction of gaze of the user does not intersect the display device for a period of time above a time threshold. Advantageously, this aspect of the present disclosure reduces false-positive indications of a distracted user by ensuring that the direction of gaze of the user does not intersect the display device for at least the time threshold.

Another aspect of the present disclosure based on the above-described method further includes converting the video content to the audio content by identifying salient features of the video content, converting, to audio content, a subset of the salient features that do not match any preexisting audio content in the video content, and interleaving the audio content with the preexisting audio content. Advantageously, this aspect of the present disclosure converts salient features of the video content that have no corresponding preexisting audio content to audio content for a distracted user. In other words, this aspect of the present disclosure reduces the amount of duplicated audio content by only generating audio content for portions of the video content that are considered salient features of the video content and for which there is no preexisting audio content.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
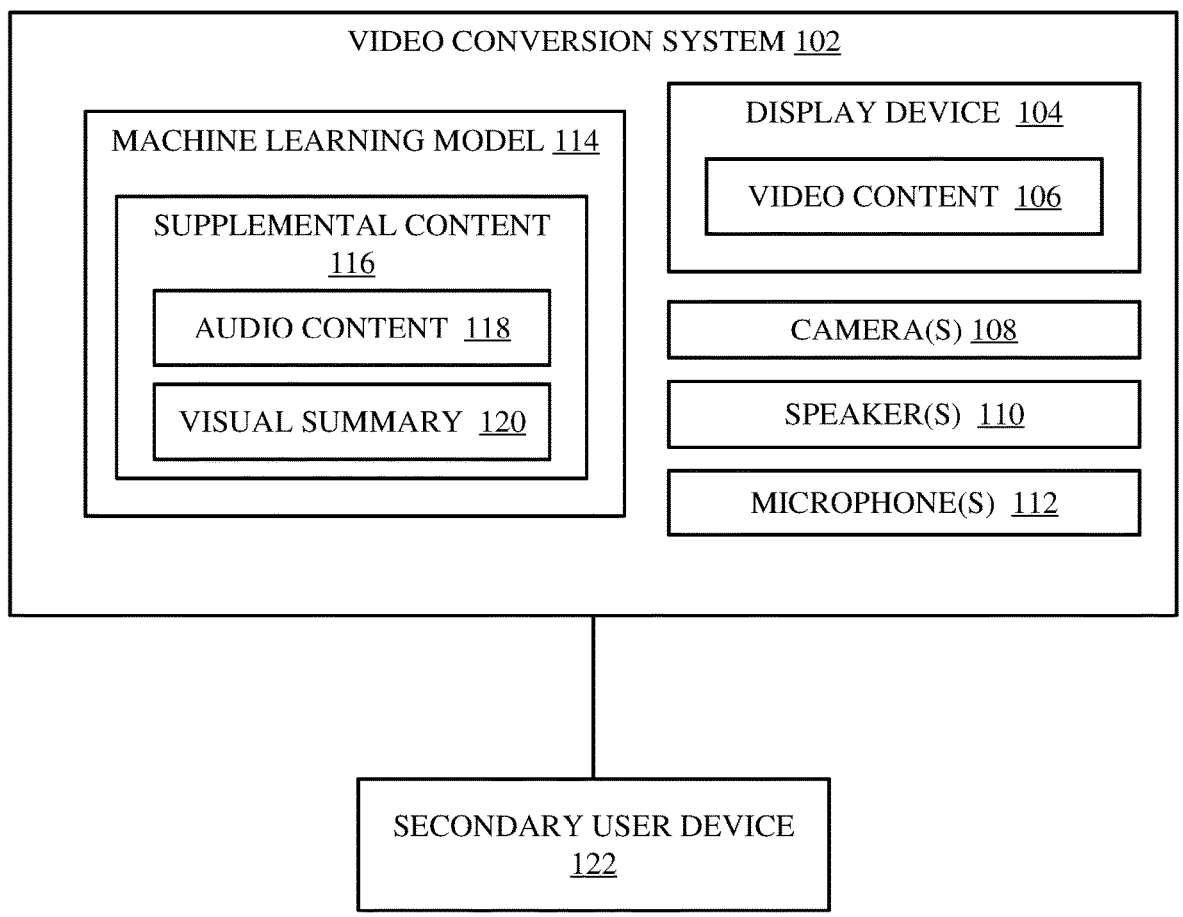
FIG. 1 illustrates a block diagram of an example computational environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward to content accessibility, and, more specifically, to generating supplemental content corresponding to video content for distracted users. While not limited to such applications, embodiments of the present disclosure may be better understood in light of the aforementioned context.

FIG. 1 illustrates a block diagram of a computational environment 100 including a video conversion system 102. The video conversion system 102 comprises a display device 104 presenting video content 106. The display device 104 can be any user interface such as, for example, a smartphone, a smart television, a tablet, a laptop, a computer, a vehicle console, a heads up display (HUD), or any other screen capable of electronically displaying video content 106. Video content 106 can be, for example, a presentation, a video conference, a movie, a show, a sporting event, or other content including graphical elements.

Video conversion system 102 can further include one or more cameras 108, one or more speakers 110, and/or one or more microphones 112. The cameras 108 can be used to continuously or intermittently monitor a direction of gaze of a user using gaze tracking techniques known by those skilled in the art. For example, cameras 108 can be configured for optical tracking based on corneal reflections of light (e.g., infrared light). However, other gaze tracking techniques are also within the spirit and scope of the present disclosure such as, but not limited to, eye-attached tracking (e.g., using a custom contact lens (not shown) configured for monitoring gaze detection) and electric potential measurement (e.g., using electrooculogram (EOG) data from electrodes (not shown) surrounding a user's eyes).

Speakers 110 can be used to present audio content 118 generated to summarize video content 106 for a distracted user. Microphones 112 can be used to receive verbal feedback from a user for updating a machine learning model 114 or otherwise modifying aspects of the video conversion system 102.

The video conversion system 102 further includes a machine learning model 114 configured to ingest the video content 106 and generate supplemental content 116. The machine learning model 114 can be trained using historical video content and historical supplemental content. The supplemental content 116 can include audio content 118 and/or a visual summary 120. The supplemental content 116 can be used to convey visual information from the video content 106 to a user that is distracted (e.g., not looking at the display device 104) while they are distracted (e.g., audio content 118) and/or after they are distracted (e.g., visual summary 120).

In some embodiments, the machine learning model 114 can include any number of machine learning algorithms such as, but not limited to, natural language processing (NLP), decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning model 114 can be configured to perform machine learning on a training set of historical video content and corresponding historical supplemental content using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques. After training the machine learning model 114 on a training set of historical video content and corresponding historical supplemental content, the machine learning model 114 can ingest video content 106 and output supplemental content 116, where the supplemental content 116 can include audio content 118 and/or visual summary 120.

Audio content 118 can be audio descriptions of otherwise unstated information such as, but not limited to, presentation content (e.g., information on a slide of a presentation), gestures (e.g., hand gestures for emphasis), facial expressions (e.g., smiling, frowning, grimacing, laughing, etc.), motions or movements (e.g., notable player movements during a portion of a sporting event), scene information (e.g., a description of a background in a show, movie, or other presentation), and/or other information that may be useful in conveying the content, context, or subtext of video content 106 to a user that cannot see the video content 106. In some embodiments, audio content 118 is only generated for portions of video content 106 that meet at least one of the following criteria: (i) the portion of video content 106 is considered a salient portion, and/or (ii) the portion of the video content 106 has no preexisting audio content associated with it.

Salient portions of video content 106 can be portions that are important or useful for understanding the information, context, tone, perspective, or other explicit or implicit information associated with the video content 106. As one example, a chart may be considered a salient portion of the video content 106, whereas a presenter adjusting a microphone or taking a drink of water may be considered to not be a salient portion of the video content.

Preexisting audio content can refer to audio content that (i) exists in the original video content 106 and (ii) adequately describes the video content 106 to a viewer that cannot see the video content 106. For example, an example video content 106 may contain a statement such as "as shown in the chart, these two factors are correlated." Thus, while audio content associated with this portion of the video content does exists, it is insufficient to adequately describe the corresponding portion of the video content 106 to a viewer that cannot see the video content 106. For example, the viewer may not know what the factors are, and whether they're positively correlated, negatively correlated, or inversely correlated.

The machine learning model 114 can be configured to accurately identify salient portions of the video content 106 and portions of the video content 106 associated with preexisting audio content as described above.

The visual summary 120 can be a graphical summary of the information shown in the video content 106 while the user is distracted (e.g., not looking at the display device 104). For example, the visual summary 120 can include text summarizing the video content 106 that played while the user was distracted.

In some embodiments, the visual summary 120 can be displayed to the display device 104 or a secondary user device 122. When the visual summary 120 is displayed to the display device 104, the visual summary 120 can be displayed in response to determining that the user's direction of gaze has returned to the display device 104. When the visual summary 120 is displayed to the secondary user device 122, the visual summary 120 can be transmitted to the secondary user device 122 in the form of, for example, a short message service (SMS) message, a text message, an email, a voice message, a message from an application associated with the video conversion system 102, or another form. The visual summary 120 can be transmitted to the secondary user device 122 using a network such as, but not limited to, the Internet, a cellular network, a short-range network (e.g., Bluetooth®, etc.), or another network.

The secondary user device 122 can be, but is not limited to, a smartphone, a tablet, a laptop, a heads-up-display (HUD), smartglasses, smart contacts, a vehicle interface console, a smartwatch, or another secondary user device.

Video conversion system 102 can be implemented in various configurations. For example, machine learning model 114 can be software downloaded to hardware, such as a laptop, where the laptop includes the display device 104 (e.g., a screen), the camera 108, the speaker 110, and the microphone 112. In such an example, the video conversion system 102 is realized by the laptop executing software configured to utilize the laptop as the video conversion system 102.

In another example, the video conversion system 102 can be embodied in a vehicle, where the machine learning model 114 is software downloaded to, and executable by, hardware associated with the vehicle, and where the vehicle is associated with a display device 104, camera(s) 108, speaker(s) 110, and microphone(s) 112. In such an example, the video conversion system 102 is realized by the vehicle executing software configured to utilize the vehicle as the video conversion system 102.

In yet another example, the video conversion system 102 can be a standalone system that is usable in conjunction with one or more other systems. For example, the video conversion system 102 can include a display device 104, camera(s) 108, speaker(s) 110, microphone(s) 112, and the machine learning model 114. In this example, the video conversion system 102 can be communicatively coupled to a laptop, smartphone, television, or another device capable of presenting video content 106.

Finally, although the discussion thus far has discussed a single user, any number of users fall within the spirit and scope of the present disclosure. In one example, a group of individuals, each with headphones communicatively coupled to the video conversion system 102, can be simultaneously observing video content 106. As individuals in the group intermittently become distracted, supplemental content 116 such as audio content 118 can be provided to the distracted individuals via their respective headphones while it is not necessarily provided to other individuals that are not distracted.

Although the aforementioned example relates to a group of people in a similar physical location, that is also not necessarily limiting. For example, a group of individuals can virtually meet using a videoconference, and the video conversion system 102 can be incorporated into the video conferencing software such that when any of the attendees in the videoconference become distracted from the video content 106, supplemental content 116 such as audio content 118 can be provided to those distracted individuals.

Figure 2:
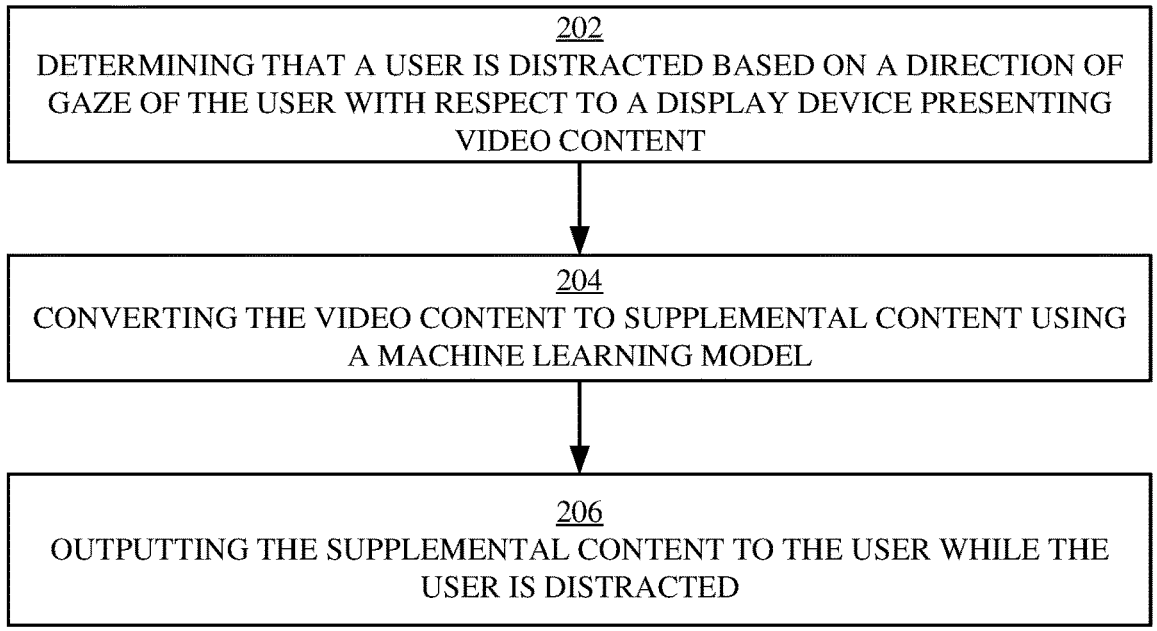
FIG. 2 illustrates a flowchart of an example method for providing audio content corresponding to video content to a distracted user, in accordance with some embodiments of the present disclosure.

FIG. 2 illustrates a flowchart of an example method 200 for providing supplemental content 116 corresponding to video content 106 to a distracted user, in accordance with some embodiments of the present disclosure. The method 200 can be implemented by, for example a video conversion system 102, a computer (e.g., computer 500 of FIG. 5), a processor, or another configuration of hardware and/or software.

Operation 202 includes determining that a user is distracted based on a direction of gaze of the user with respect to a display device 104 presenting video content 106. In some embodiments, operation 202 includes determining that the direction of gaze of the user does not intersect the display device 104 for a predetermined period of time (e.g., where the predetermined period of time is less than, more than, or equal to three seconds, five seconds, ten seconds, or another amount of time). In some embodiments, the direction of gaze of the user is determined based on camera(s) 108 using techniques, strategies, and technologies understood by those skilled in the art for determining a direction of gaze of a user.

Operation 204 includes converting the video content 106 to supplemental content 116 using a machine learning model 114. In various embodiments, the supplemental content 116 can include audio content 118 and/or a visual summary 120. In some embodiments, operation 204 automatically occurs in response to determining that the user is distracted in operation 202.

Operation 206 includes outputting the supplemental content 116 to the user while the user is distracted. For example, if the supplemental content 116 includes audio content 118, then operation 206 can include outputting the audio content 118 via one or more speaker(s) 110. As another example, if the supplemental content 116 includes a visual summary 120, then operation 206 can include outputting the visual summary 120 to a secondary user device 122.

Figure 3A:
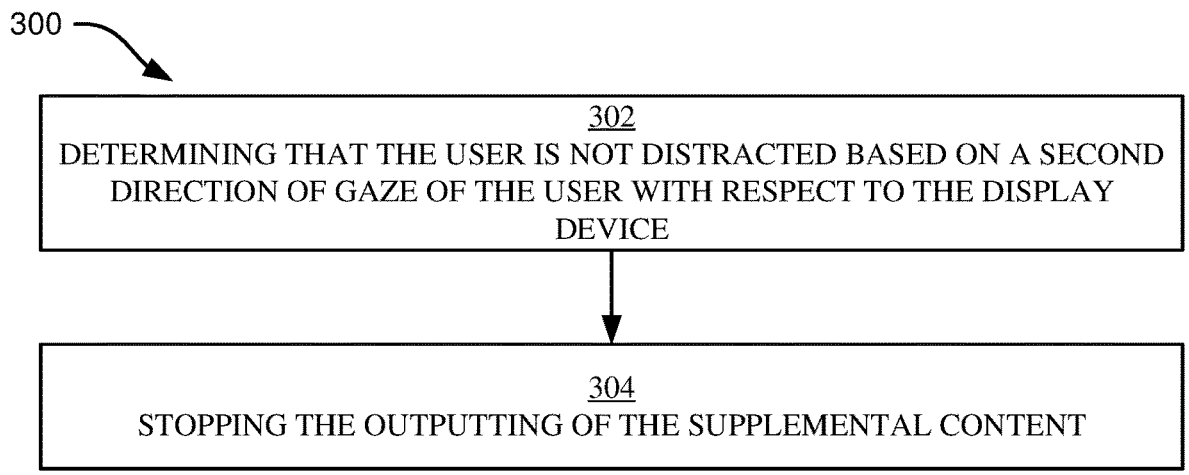
FIG. 3A illustrates a flowchart of an example method for stopping the outputting of the audio content in response to determining the user is no longer distracted, in accordance with some embodiments of the present disclosure.

FIG. 3A illustrates a flowchart of an example method 300 for stopping the outputting of the audio content 118 in response to determining the user is no longer distracted, in accordance with some embodiments of the present disclosure. The method 300 can be implemented by, for example a video conversion system 102, a computer (e.g., computer 500 of FIG. 5), a processor, or another configuration of hardware and/or software. In some embodiments, the method 300 occurs after operation 206 of the method 200 of FIG. 2.

Operation 302 includes determining that the user is not distracted based on a second direction of gaze of the user with respect to the display device 104. In some embodiments, the second direction of gaze of the user is based on data collected from one or more camera(s) 108 and using techniques, strategies, and technologies known to those skilled in the art of gaze tracking. In some embodiments, operation 302 includes determining that the second direction of gaze intersects with the display device 104 for at least a threshold period of time (e.g., where the threshold period of time less, than, more than, or equal to one second, three seconds, five seconds, or a different amount of time).

Operation 304 includes stopping the outputting of the audio content 118 in response to determining that the user is no longer distracted. Advantageously, the method 300 ensures that audio content 118 is only provided to the user when it is needed, thereby improving the usability of the video conversion system 102.

Figure 3B:
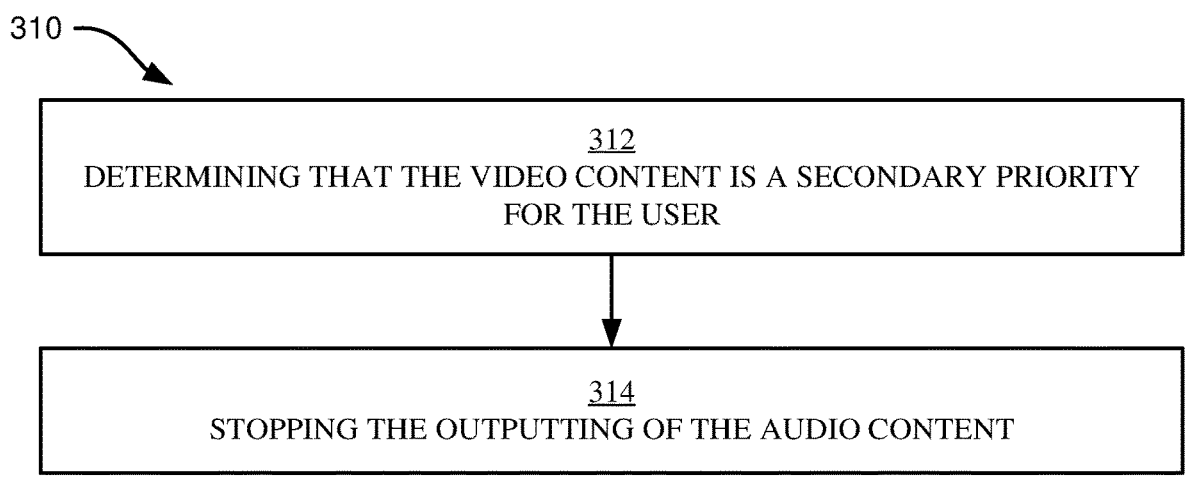
FIG. 3B illustrates a flowchart of an example method for stopping the outputting of the audio content in response to determining the user has prioritized another task, in accordance with some embodiments of the present disclosure.

FIG. 3B illustrates a flowchart of an example method 310 for stopping the outputting of the audio content 118 in response to determining the user has prioritized another task, in accordance with some embodiments of the present disclosure. The method 310 can be implemented by, for example a video conversion system 102, a computer (e.g., computer 500 of FIG. 5), a processor, or another configuration of hardware and/or software. In some embodiments, the method 310 occurs after operation 206 of the method 200 of FIG. 2.

Operation 312 includes determining that the video content 106 is a secondary priority for the user. For example, operation 312 can include determining that the user is on another phone call, that the user is driving, that the user is having a face-to-face conversation with another individual, and so on. Accordingly, determining that the video content 106 is a secondary priority can be derived from information collected from one or more camera(s) 108, one or more microphone(s) 112, a secondary user device 122, and/or other components such as a vehicle navigation system that may be communicatively coupled to the video conversion system 102. For example, the one or more camera(s) 108 can use machine vision to determine that the user is talking on a cell phone (e.g., secondary user device 122) while the display device 104 is presenting video content 106. As another example, the microphone(s) 112 can determine that the user is engaged in a face-to-face conversation with another individual.

Operation 314 includes stopping the outputting of the audio content 118. Operation 314 relates to stopping the outputting of the audio content 118, however, operation 314 does not necessarily stop the outputting of the visual summary 120. In fact, in some embodiments, if the audio content 118 is stopped, then generation of the visual summary 120 can be automatically started. Advantageously, the information in the video content 106 that the user is missing can nonetheless be provided to the user (e.g., by the visual summary 120) without disrupting the user (e.g., as would occur if outputting audio content 118).

Figure 3C:
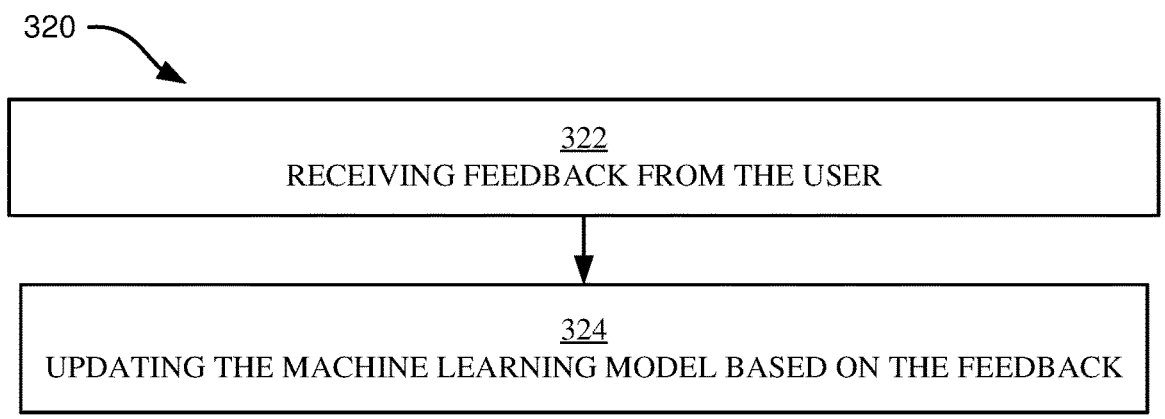
FIG. 3C illustrates a flowchart of an example method for updating a machine learning model based on user feedback, in accordance with some embodiments of the present disclosure.

FIG. 3C illustrates a flowchart of an example method 320 for updating a machine learning model 114 based on user feedback, in accordance with some embodiments of the present disclosure. The method 320 can be implemented by, for example a video conversion system 102, a computer (e.g., computer 500 of FIG. 5), a processor, or another configuration of hardware and/or software. In some embodiments, the method 320 occurs after operation 206 of the method 200 of FIG. 2.

Operation 322 includes receiving feedback from the user. In some embodiments, the feedback is verbal feedback received by one or more microphone(s) 112. In some embodiments, the feedback is responsive to one or more questions presented to the user via the display device 104 and/or the one or more speaker(s) 110. In some embodiments, the feedback is related to adjustable settings such as a user increasing or decreasing characteristics of the supplemental content 116.

Operation 324 includes updating the machine learning model 114 based on the feedback. In some embodiments, after updating the machine learning model 114, the method 320 returns to operation 202 or operation 204 of the method 200 in order to apply the updates to improve detecting a distracted user (operation 202) and/or improve converting the video content 106 to the supplemental content 116 (operation 204). Advantageously, the method 320 improves usability and accuracy of the video conversion system 102 over time by incorporating user feedback into the machine learning model 114.

Figure 4A:
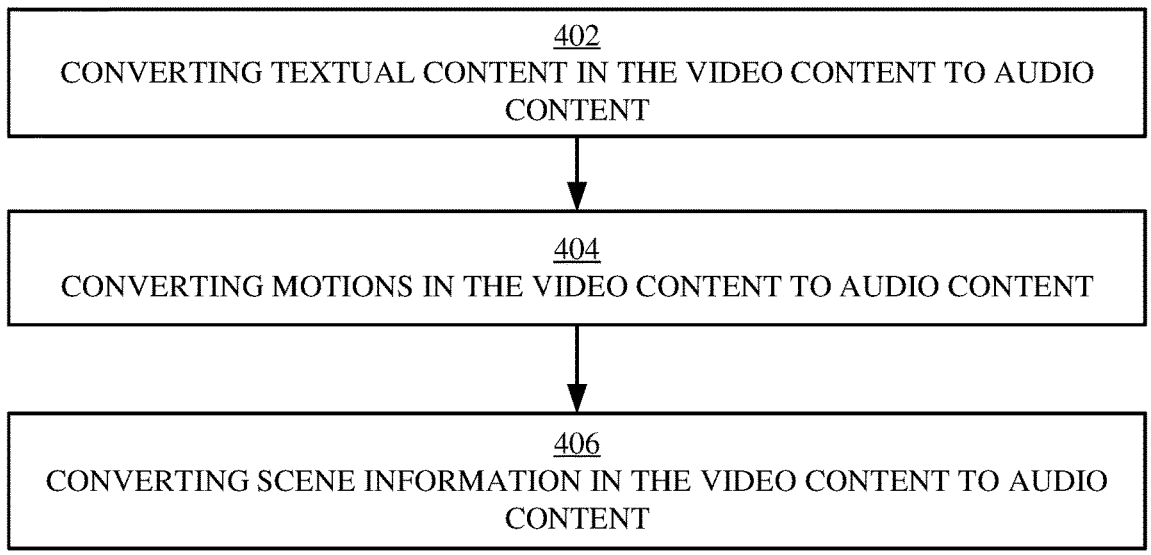
FIG. 4A illustrates a flowchart of an example method for converting video content to audio content, in accordance with some embodiments of the present disclosure.

FIG. 4A illustrates a flowchart of an example method 400 for converting video content 106 to audio content 118, in accordance with some embodiments of the present disclosure. The method 400 can be implemented by, for example a video conversion system 102, a computer (e.g., computer 500 of FIG. 5), a machine learning model 114, a processor, or another configuration of hardware and/or software. In some embodiments, the method 400 is a sub-method of operation 204 of the method 200 of FIG. 2. Operations 402-406 can utilize NLP, optical character recognition, machine vision, and/or other techniques, strategies, and technologies.

Operation 402 includes converting textual content in the video content 106 to audio content 118. For example, operation 402 can include converting text of a presentation to audio content 118. As another example, operation 402 can include converting streaming text (e.g., ticker-tape text presented at a bottom of a newscast) to audio content 118. As yet another example, operation 402 can include converting a graphical representation to audio content 118, where the audio content 118 can describe chart titles, axis titles, axis metrics, names of data, trends of data, relationships between sets of data, and the like.

Operation 404 includes converting motions in the video content 106 to audio content 118. Motions can include, for example, gestures, movements, expressions, and the like. Operation 404 can, for example, generate audio content 118 describing a gesture made by a presenter for emphasis in the video content 106. As another example, operation 404 can generate audio content 118 describing movements of several players during a sporting event in the video content 106.

Operation 406 can include converting scene information in the video content 106 to audio content 118. For example, operation 406 can include generating audio content 118 describing landscapes, locations, people, times of day, weather, and the like.

Figure 4B:
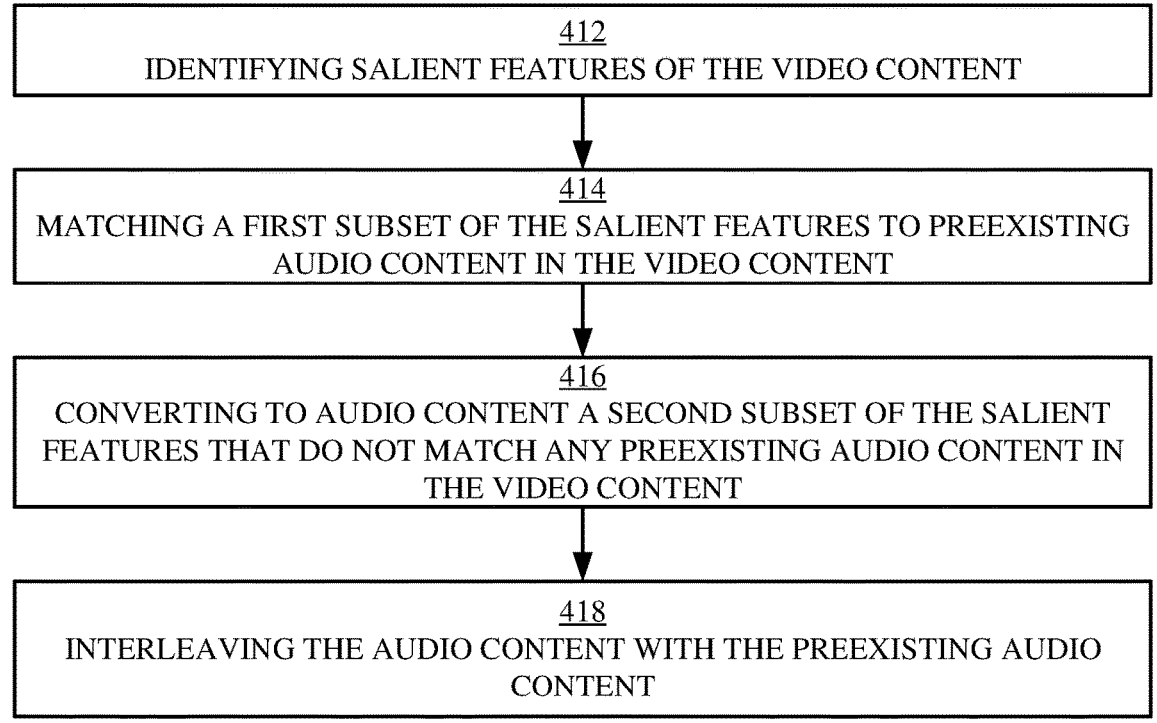
FIG. 4B illustrates a flowchart of another example method for converting video content to audio content, in accordance with some embodiments of the present disclosure.

FIG. 4B illustrates a flowchart of another example method 410 for converting video content 106 to audio content 118, in accordance with some embodiments of the present disclosure. The method 410 can be implemented by, for example a video conversion system 102, a computer (e.g., computer 500 of FIG. 5), a machine learning model 114, a processor, or another configuration of hardware and/or software. In some embodiments, the method 410 is a sub-method of operation 204 of the method 200 of FIG. 2.

Operation 412 includes identifying salient features of the video content 106. Salient features can include features that are important, critical, or notable for understanding the video content 106. Salient features can be detected by, for example, the machine learning model 114.

Operation 414 includes matching a first subset of the salient features to preexisting audio content in the video content 106. For example, if a presenter reads a bullet point from a presentation in the video content 106, then the text associated with the first bullet point is added to the first subset insofar as audio content already exists for that portion of the video content 106 (e.g., in the form of the presenter reading the text associated with the bullet point). As previously discussed, preexisting audio content can refer to audio content that (i) exists in the original video content 106 and (ii) adequately describes the video content 106 to a viewer who cannot see the video content 106. Thus, in the earlier example, if the presenter mentioned the bulleted text but did not elaborate on it, then that portion of the original audio content would not qualify as preexisting audio content insofar as it did not adequately describe the video content 106 to a viewer who cannot see the video content 106.

Operation 416 includes converting to audio content 118 a second subset of the salient features that do not match any preexisting audio content in the video content 106. Thus, operation 416 can be useful for generating audio content 118 associated with salient features of the video content 106 that have no preexisting audio content.

Operation 418 includes interleaving the audio content 118 with the preexisting audio content. Interleaving can refer to a variety of strategies, techniques, and methodologies for coherently incorporating the generated audio content 118 into the video content 106 with preexisting audio content. For example, operation 418 can include inserting the generated audio content 118 into portions of the video content 106 that do not have any preexisting audio content. As another example, operation 418 can include replacing certain original audio content in the video content 106 with generated audio content 118, where the generated audio content 118 is more descriptive than the original audio content. As yet another example, operation 418 can include increasing the playback speed of the preexisting audio content in order to create room in the video content 106 for inserting the generated audio content 118. As still another example, operation 418 can include pausing the video content 106 on a certain frame (or decreasing the playback speed of the video content) and inserting the generated audio content 118 into the video content 106 while it is paused on the certain frame (or playing at the decreased playback speed). These and other techniques, strategies, and methodologies are within the spirit and scope of the present disclosure for interleaving the generated audio content 118 with the preexisting audio content in the video content 106.

Figure 5:
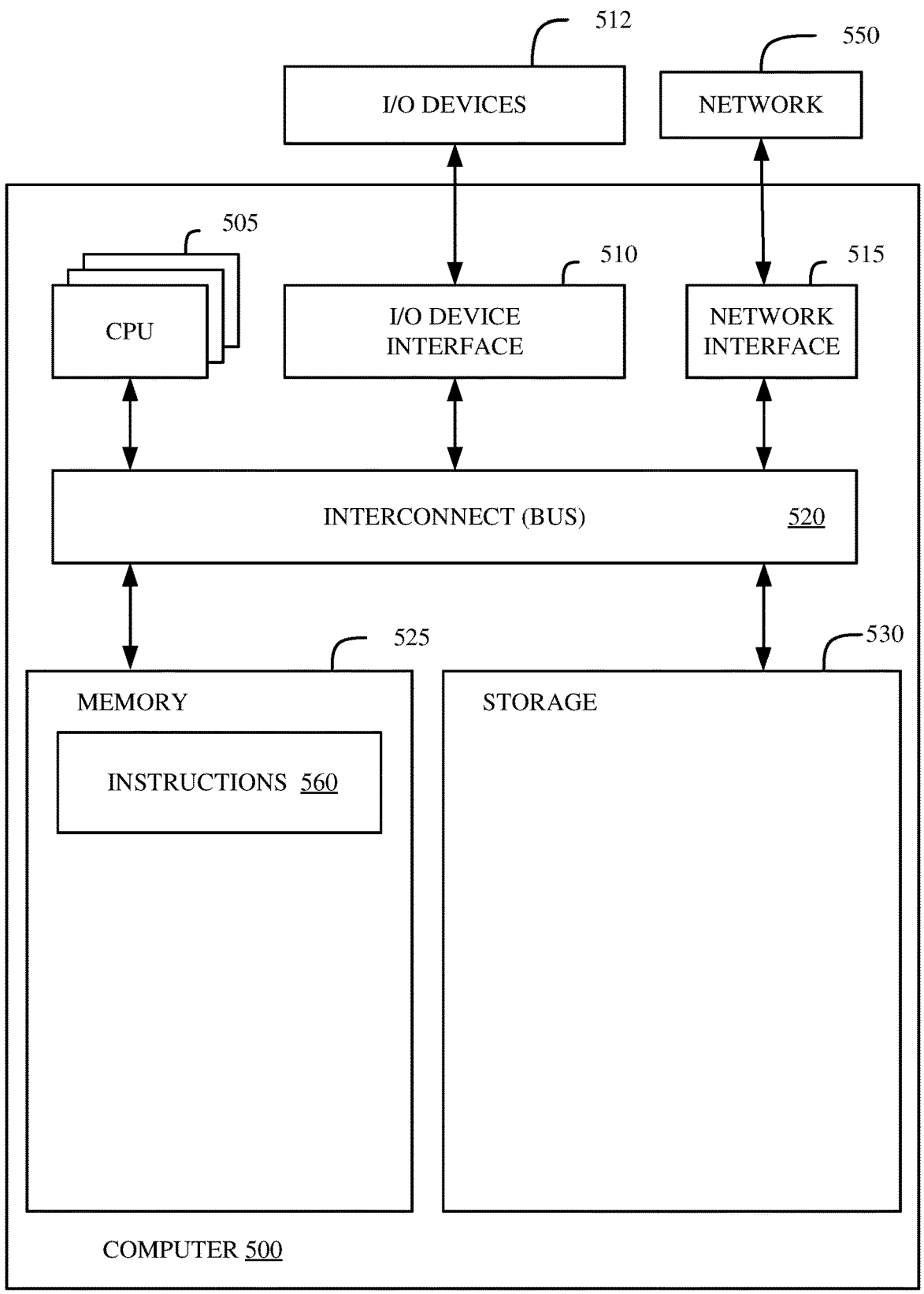
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all of the method described in FIGS. 2-4 and/or implement the functionality discussed in any one of FIG. 1. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine such that the client machine executes the method, or a portion of the method, based on the instructions provided by computer 500. In some embodiments, the computer 500 is incorporated into (or functionality similar to computer 500 is virtually provisioned to) the video conversion system 102 of FIG. 1 or another aspect of the present disclosure.

Computer 500 includes memory 525, storage 530, interconnect 520 (e.g., BUS), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more busses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the methods of FIGS. 2-4 and/or implement the functionality discussed in FIG. 1. In some embodiments, instructions 560 can be referred to as a video content conversion protocol, video content conversion instructions, and/or a video content conversion mechanism. Although instructions 560 are shown in memory 525, instructions 560 can include program instructions collectively stored across numerous computer-readable storage media and executable by one or more CPUs 505.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
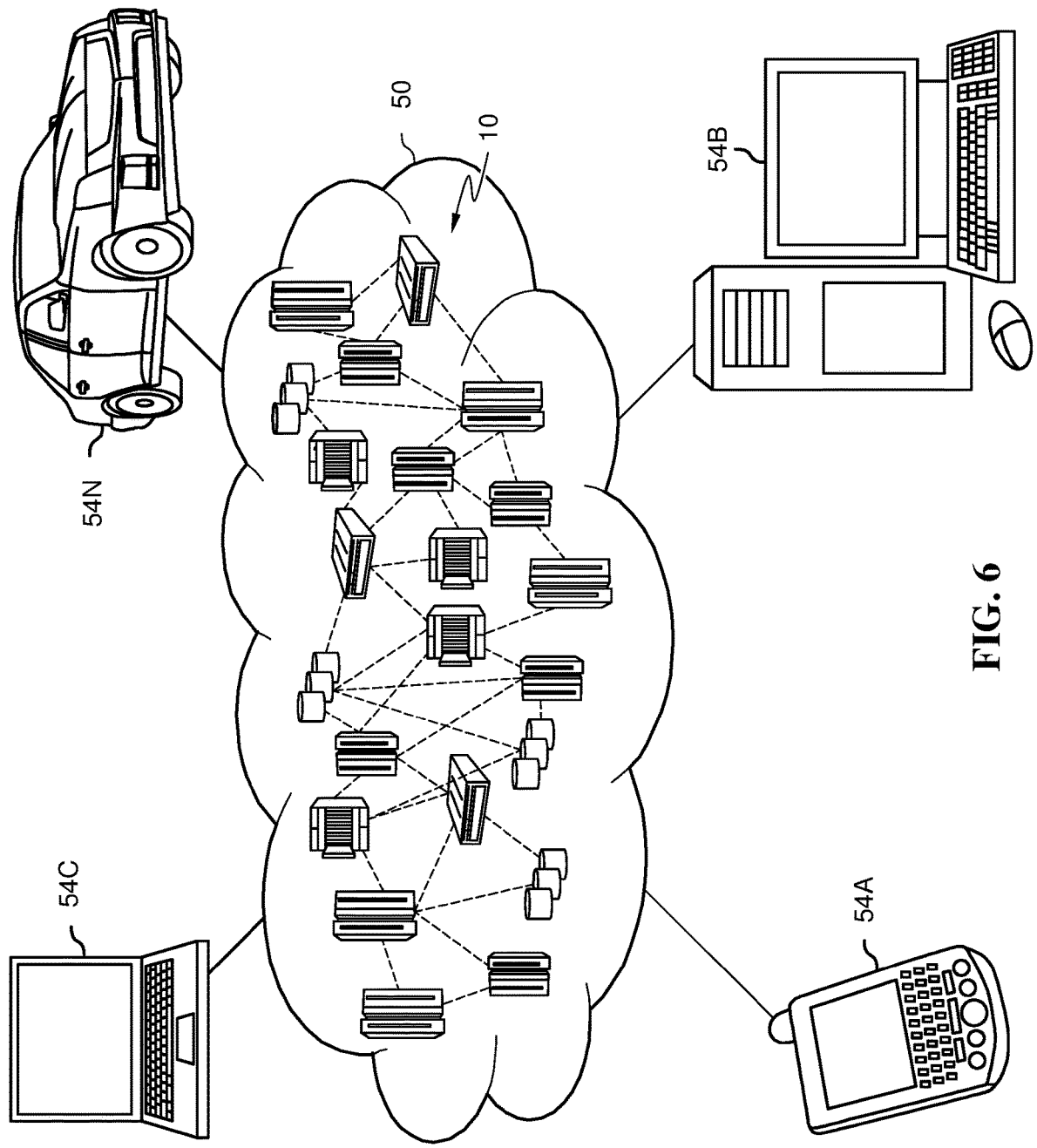
FIG. 6 depicts a cloud computing environment, in accordance with some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
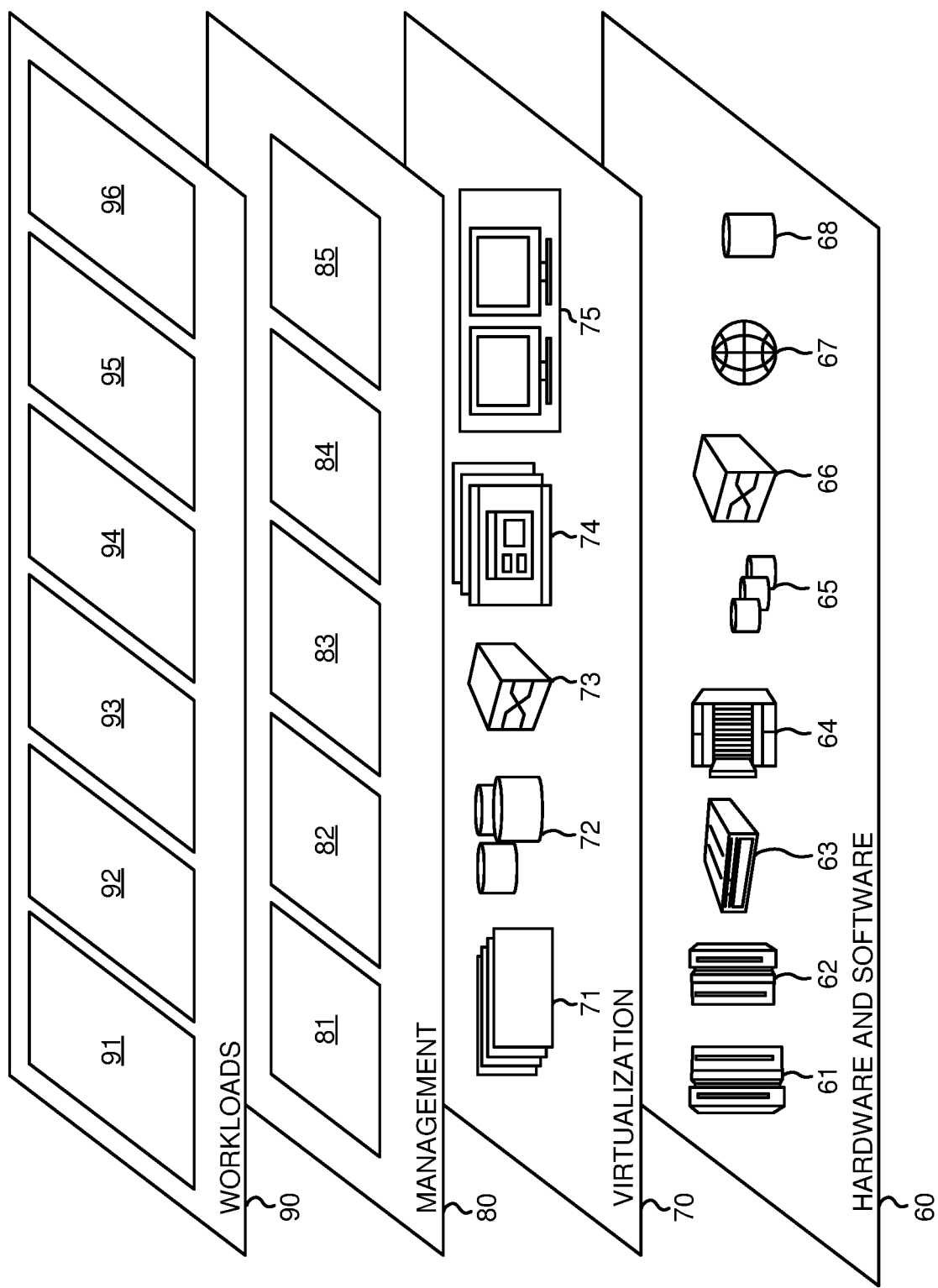
FIG. 7 depicts abstraction model layers, in accordance with some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video content conversion 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the method described with respect to FIGS. 2-4 and/or implement any portion of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

Several non-limiting example embodiments of the present disclosure will now be discussed.

Example 1. A computer-implemented method comprising determining, using data from at least one camera, that a user is distracted based on a direction of gaze of the user with respect to a display device presenting video content; converting, by a machine learning model, the video content to audio content in response to determining the user is distracted, wherein the audio content comprises a description of the video content; and outputting, using at least one speaker, the audio content to the user while the user is distracted.

Example 2. The method of Example 1, wherein determining the user is distracted further comprises determining the direction of gaze of the user does not intersect the display device for a period of time above a time threshold.

Example 3. The method of any of Examples 1-2, wherein converting the video content to the audio content further comprises converting textual content in the video content to audio information in the audio content.

Example 4. The method of any of Examples 1-3, wherein converting the video content to the audio content further comprises converting motions in the video content to audio information in the audio content.

Example 5. The method of any of Examples 1-4, wherein converting the video content to the audio content further comprises converting scene information in the video content to audio information in the audio content.

Example 6. The method of any of Examples 1-5, wherein converting the video content to the audio content further comprises identifying salient features of the video content; converting, to the audio content, a subset of the salient features that do not match any preexisting audio content; and interleaving the audio content with the preexisting audio content.

Example 7. The method of Example 6, wherein interleaving the audio content with the preexisting audio content further comprises inserting the audio content into portions of the video content without any preexisting audio content.

Example 8. The method of Example 6, wherein the interleaving the audio content with the preexisting audio content further comprises increasing a speed of the preexisting audio content in order to create respective portions of the video content without any preexisting audio content and inserting the audio content into the respective portions.

Example 9. The method of Example 6, wherein the interleaving the audio content with the preexisting audio content further comprises pausing the video content and inserting the audio content while the video content is paused.

Example 10. The method of any of Examples 1-9, further comprising determining the user is not distracted based on a second direction of gaze of the user with respect to the display device; and stopping outputting the audio content to the user.

Example 11. The method of any of Examples 1-9, further comprising determining that the video content is a secondary priority to the user; and stopping outputting the audio content.

Example 12. The method of any of Examples 1-11, further comprising receiving feedback from the user in response to outputting the audio content to the user; and updating the machine learning model based on the feedback.

Example 13. The method of Example 12, wherein the feedback comprises verbal feedback received at a microphone.

Example 14. The method of any of Examples 1-13, further comprising generating a textual summary of the video content while the user is distracted; and presenting the textual summary to the user.

Example 15. The method of Example 14, wherein the textual summary is presented on the display device.

Example 16. The method of Example 14, wherein the textual summary transmitted to a personal device associated with the user and presented on the personal device.

Example 17. The method of any of Examples 1-16, wherein the method is performed by a video conversion system according to software that is downloaded to the video conversion system from a remote data processing system.

Example 18. The method of Example 17, wherein the method further comprises metering a usage of the software; and generating an invoice based on metering the usage.

Example 19. A system comprising one or more processors; and one or more computer-readable storage media storing program instructions which, when executed by the one or more processors, are configured to cause the one or more processors to perform a method according to any of Examples 1-18.

Example 20. A computer program product comprising one or more computer readable storage media, and program instructions collectively stored on the one or more computer readable storage media, the program instructions comprising instructions configured to cause one or more processors to perform a method according to any of Examples 1-18.

What is claimed is:

1. A computer-implemented method comprising:
   determining, using data from at least one camera, that a user is distracted based on a direction of gaze of the user with respect to a display device presenting video content;
   converting, by a machine learning model, the video content to audio content in response to determining the user is distracted, wherein converting the video content to the audio content further comprises:
     identifying salient features of the video content;
     converting, to the audio content, a subset of the salient features that do not match any preexisting audio content; and
     interleaving the audio content with the preexisting audio content by increasing a speed of the preexisting audio content in order to create respective portions of the video content without any preexisting audio content and inserting the audio content into the respective portions; and
   outputting, using at least one speaker, the audio content to the user while the user is distracted.

2. The method of claim 1, wherein determining the user is distracted further comprises:
   determining the direction of gaze of the user does not intersect the display device for a period of time above a time threshold.

3. The method of claim 1, wherein converting the video content to the audio content further comprises converting textual content in the video content to audio information in the audio content.

4. The method of claim 1, wherein converting the video content to the audio content further comprises converting motions in the video content to audio information in the audio content.

5. The method of claim 1, wherein converting the video content to the audio content further comprises converting scene information in the video content to audio information in the audio content.

6. The method of claim 1, wherein interleaving the audio content with the preexisting audio content further comprises inserting the audio content into portions of the video content without any preexisting audio content.

7. The method of claim 1, wherein the interleaving the audio content with the preexisting audio content further comprises pausing the video content and inserting the audio content while the video content is paused.

8. The method of claim 1, further comprising:
determining the user is not distracted based on a second direction of gaze of the user with respect to the display device; and
stopping outputting the audio content to the user.

9. The method of claim 1, further comprising:
determining that the video content is a secondary priority to the user; and
stopping outputting the audio content.

10. The method of claim 1, further comprising:
receiving feedback from the user in response to outputting the audio content to the user; and
updating the machine learning model based on the feedback.

11. The method of claim 10, wherein the feedback comprises verbal feedback received at a microphone.

12. The method of claim 1, further comprising:
generating a textual summary of the video content while the user is distracted; and
presenting the textual summary to the user.

13. The method of claim 12, wherein the textual summary is presented on the display device.

14. The method of claim 12, wherein the textual summary transmitted to a personal device associated with the user and presented on the personal device.

15. The method of claim 1, wherein the method is performed by a video conversion system according to software that is downloaded to the video conversion system from a remote data processing system.

16. The method of claim 15, wherein the method further comprises:
metering a usage of the software; and
generating an invoice based on metering the usage.

17. A system comprising:
one or more processors; and
one or more computer-readable storage media storing program instructions which, when executed by the one or more processors, are configured to cause the one or more processors to perform a method comprising:
determining, using data from at least one camera, that a user is distracted based on a direction of gaze of the user with respect to a display device presenting video content;
converting, by a machine learning model, the video content to audio content in response to determining the user is distracted, wherein converting the video content to the audio content further comprises:
identifying salient features of the video content;
converting, to the audio content, a subset of the salient features that do not match any preexisting audio content; and
interleaving the audio content with the preexisting audio content by increasing a speed of the preexisting audio content in order to create respective portions of the video content without any preexisting audio content and inserting the audio content into the respective portions; and
outputting, using at least one speaker, the audio content to the user while the user is distracted.

18. A computer program product comprising one or more non-transitory computer readable storage media, and program instructions collectively stored on the one or more non-transitory computer readable storage media, the program instructions comprising instructions configured to cause one or more processors to perform a method comprising:
determining, using data from at least one camera, that a user is distracted based on a direction of gaze of the user with respect to a display device presenting video content;
converting, by a machine learning model, the video content to audio content in response to determining the user is distracted, wherein converting the video content to the audio content further comprises:
identifying salient features of the video content;
converting, to the audio content, a subset of the salient features that do not match any preexisting audio content; and
interleaving the audio content with the preexisting audio content by increasing a speed of the preexisting audio content in order to create respective portions of the video content without any preexisting audio content and inserting the audio content into the respective portions; and
outputting, using at least one speaker, the audio content to the user while the user is distracted.

* * * * *